United States Patent
Bonnett et al.

(10) Patent No.: US 7,111,292 B2
(45) Date of Patent: Sep. 19, 2006

(54) APPARATUS AND METHOD FOR SECURE PROGRAM UPGRADE

(75) Inventors: William B. Bonnett, Dallas, TX (US); Gabriel T. Dagani, Bluffton, OH (US); Alec C. Robinson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 609 days.

(21) Appl. No.: 10/197,198

(22) Filed: Jul. 17, 2002

(65) Prior Publication Data

US 2003/0051090 A1    Mar. 13, 2003

Related U.S. Application Data

(60) Provisional application No. 60/322,252, filed on Sep. 10, 2001.

(51) Int. Cl.
 G06F 9/44       (2006.01)
 G06F 9/445      (2006.01)
(52) U.S. Cl. .............. 717/171; 717/168; 717/169; 717/170; 717/172; 717/173; 717/174; 717/175; 717/176; 717/177; 717/178
(58) Field of Classification Search ......... 717/168–178
See application file for complete search history.

(56) References Cited

U.S. PATENT DOCUMENTS

| | | | | |
|---|---|---|---|---|
| 5,664,195 A * | 9/1997 | Chatterji | ...................... | 717/178 |
| 5,732,275 A * | 3/1998 | Kullick et al. | ............... | 717/170 |
| 5,761,504 A * | 6/1998 | Corrigan et al. | ................ | 713/2 |
| 5,764,992 A * | 6/1998 | Kullick et al. | ............... | 717/170 |
| 5,778,234 A * | 7/1998 | Hecht et al. | ................. | 717/173 |
| 5,787,288 A * | 7/1998 | Nagata et al. | .............. | 717/173 |
| 5,978,591 A * | 11/1999 | Bartholomew et al. | ...... | 717/168 |
| 6,131,159 A * | 10/2000 | Hecht et al. | .................... | 713/1 |
| 6,341,373 B1 * | 1/2002 | Shaw | .......................... | 717/173 |
| 6,542,943 B1 * | 4/2003 | Cheng et al. | .................. | 710/36 |
| 6,594,757 B1 * | 7/2003 | Martinez | ........................ | 713/2 |
| 6,598,159 B1 * | 7/2003 | McAlister et al. | .............. | 713/2 |
| 6,763,403 B1 * | 7/2004 | Cheng et al. | .................. | 710/36 |
| 2002/0026634 A1 * | 2/2002 | Shaw | .......................... | 717/173 |
| 2002/0057800 A1 * | 5/2002 | Gordon et al. | .............. | 380/251 |
| 2003/0131180 A1 * | 7/2003 | Ho et al. | ........................ | 711/1 |
| 2004/0163135 A1 * | 8/2004 | Giaccherini et al. | ......... | 725/136 |

* cited by examiner

*Primary Examiner*—Kakali Chaki
*Assistant Examiner*—William H. Wood
(74) *Attorney, Agent, or Firm*—Robert D. Marshall, Jr.; W. James Brady; Frederick J. Telecky, Jr.

(57) ABSTRACT

An appliance includes a memory having at least a hidden partition of memory. The hidden partition of memory operates to store at least a portion of a program capable of contributing to one or more functions of the appliance. The appliance also includes a controller operable to process at least a portion of the program stored on the hidden portion of memory. The appliance further includes an external interface operable to provide access to at least an open portion of the memory. In one particular embodiment, the hidden portion of memory is inaccessible through the external interface. After modifying the at least a portion of the program, a decrypted update file is deleted from the open portion of memory and the external interface may be reestablished.

6 Claims, 2 Drawing Sheets

US 7,111,292 B2

APPARATUS AND METHOD FOR SECURE PROGRAM UPGRADE

RELATED APPLICATION

This application claims the benefit under 35 U.S.C. § 119(e) of U.S. Provisional Application Ser. No. 60/322,252, filed Sep. 10, 2001.

TECHNICAL FIELD OF THE INVENTION

This invention relates generally to the field of computing systems, and more particularly to an apparatus and method for secure program upgrading.

Overview

Technological advances have typically reduced the amount of time a business unit allots between development and manufacture of communication and/or computation devices. As a result, device manufacturers are typically unable to test the complete functionality of the device before delivery to a user. This can result in the identification of mistakes and/or bugs in a program stored on the device after delivery of the device to the user. In other cases, it may be desirable to provide enhanced functionality to a device over the capabilities originally supplied with that device. Consequently, device manufacturers typically need a means of securely updating the device after delivery to the user.

SUMMARY OF EXAMPLE EMBODIMENTS

The present invention provides an improved apparatus and method for secure firmware upgrades. In accordance with the present invention, an apparatus, and method for secure firmware upgrades is provided that reduce or eliminate at least some of the shortcomings associated with prior approaches.

In one embodiment, an appliance comprises a memory comprising at least a hidden portion of memory operable to store at least a portion of a program capable of contributing to one or more functions of the appliance. The appliance also comprises a controller operable to process at least a portion of the program stored on the hidden portion of memory. The appliance further comprises an external interface operable to provide access to at least an open portion of the memory. In one particular embodiment, the hidden portion of memory is inaccessible through the external interface.

In another embodiment, an appliance comprises an external interface operable to receive a program update. The appliance also comprises a memory comprising a hidden portion inaccessible through the external interface, wherein at least a portion of program to be updated resides in the hidden portion of memory. The appliance further comprises a controller operable to modify at least a portion of the program residing on the hidden portion of memory based at least in part on the program update received at the external interface.

In a method embodiment, a method of upgrading a program stored on an appliance comprises receiving from a communication link an encrypted update file at an external interface of an appliance. The method also comprises storing the encrypted update file on an open portion of a memory accessible through the external interface. The method further comprises isolating the appliance from the communication link. After isolating the appliance, the method comprises decrypting the encrypted update file. The method further comprises modifying at least a portion of a program stored on a hidden partition of memory based at least in part on the decrypted update file. In one particular embodiment, the hidden partition of memory is inaccessible through the external interface.

In another method embodiment, a method of upgrading a program stored on an appliance comprises receiving from a communication link an encrypted update file at an external interface of an appliance. The method also comprises storing the encrypted update file on a portion of a memory accessible through an external interface. The method further comprises decrypting the encrypted update file. After decrypting the encrypted update file, the method also comprises modifying at least a portion of a program stored on a hidden partition of memory based at least in part on the decrypted update file. In one particular embodiment, the hidden partition of memory is inaccessible through the external interface.

Depending on the specific features implemented, particular embodiments of the present invention may exhibit some, none, or all of the following technical advantages. Various embodiments substantially restrict access to portions of a program stored in a memory accessible to an appliance. Restricting access to programs and/or portions of a program can help prevent a user from deleting or corrupting those portions of the program, which can lead to an improved reliability of the appliance. In addition, restricting access to portions of the program can assist program designers in the protection of licensed code, firmware, and/or software. Some embodiments allow for a secure program upgrade of the restricted access portions of the program stored in a memory accessible to the appliance.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
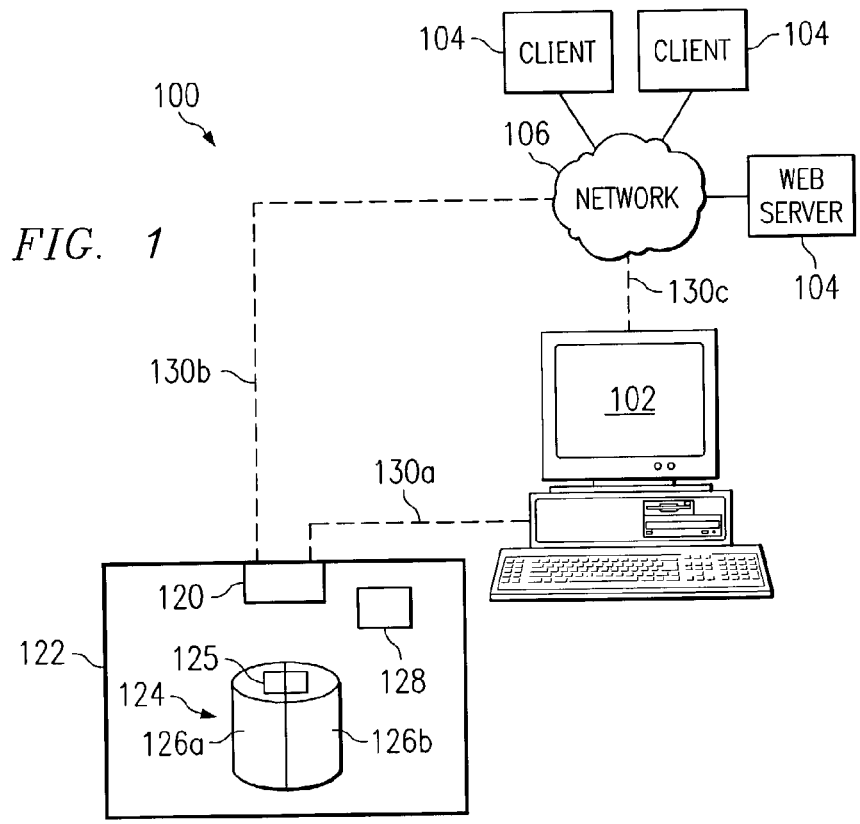
FIG. 1 is a block diagram illustrating one example of a computing system including an appliance.

FIG. 1 is a block diagram illustrating one example of a computing system 100 including an appliance 122. In the illustrated embodiment, system 100 includes at least one appliance 122 capable of performing a desired communicating and/or computing functionality. Appliance 122 may comprise any device or combination of devices including one or more software and/or firmware modules operable to affect the function of the device. In some non-limiting examples, appliance 122 could comprise a computing and/or communicating device, such as, for example, a personal digital assistant (PDA), a cell phone, a digitized audio recorder/player, or any other digital or analog device. In other non-limiting examples of appliance 122 include any device that implements a program operable to carry out a desired functionality, such as, a home appliance (e.g., refrigerator or dishwasher), a power tool, or any other digital or analog device.

In this embodiment, appliance 122 executes one or more programs 125a–125n capable of at least partially contributing to one or more functions of appliance 122. That is, programs 125 are not required to be capable of performing a desired function of appliance 122 alone, but may contribute to the performance of the function as part of a larger routine. Programs 125 stored on memory device 124 may include, for example, software, firmware, code, portions of code, data compilations, and/or a combination of these or any other type of information. In various embodiments, program 125 stored on memory device 124 may include firmware having a software image for an embedded device.

As the amount of time between the development and manufacture of digital and/or analog communication and/or computation appliances decrease, appliance manufacturers are unable to test the complete functionality of the appliance before delivery to a user. This typically results in the identification of mistakes and/or bugs in the program stored on the appliance after delivery of the appliance to the user. Addition, appliance manufacturers may desire to provide enhanced functionality to the appliance over the capabilities originally supplied with that appliance. Consequently, appliance manufacturers typically need a means of updating the appliance after delivery to the user.

From time to time, it may be desirable to update one or more programs 125 stored in appliance 122 and/or to add additional programs 125. In this example, appliance 122 operates to receive an update file capable of updating and/or adding one or more programs 125 stored in appliance 122. The update file may comprise, for example, any software, firmware, code, data compilation, operating software applications, and/or combinations of these or any other type of information. In various embodiments, the update file can be generated by an authoring tool capable of encrypting the update file before communicating the update file to client 104 and/or storing the update file on a storage medium (e.g., compact disk, floppy disk, etc.).

In one particular embodiment, appliance 122 operates to receive the update file through a network 106 coupled to appliance 122. As used throughout this document, the term "couple" and/or "coupled" refers to any direct or indirect communication between two or more elements, whether or not those elements are in physical contact with one another. In one particular embodiment, appliance 122 couples to network 106 through communications link 130b. Communicating the update file through network 106 is useful, for example, when the update file is stored on a client 104 coupled to network 106. Locating the update file on client 104 enables a user of the appliance to access a URL and download the update file. In some embodiments, appliance 122 can automatically search a designated URL for the update file and, if found, download the update file to appliance 122. In those embodiments, appliance 122 can automatically search the designated URL periodically, randomly, and/or on command.

Network 106 may comprise, for example, a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations. Network 106 may comprise any wireless network, wireline network, or combination of wireless and wireline networks capable of supporting communication between network elements using ground-based and/or space-based components.

One or more clients 104 may couple to network 106. Each client 104 may include any computing and/or communicating device operable to communicate and/or receive information over network 106. Each client may include, for example, a web server, a workstation, a mainframe computer, a mini-frame computer, a desktop computer, a laptop computer, a personal digital assistant, or any other computing or communicating device. In operation, client 104 may execute with any of the well-known MS-DOS, PC-DOS, OS-2, MAC-OS, WINDOWS™, UNIX, or other appropriate operating systems.

In an alternative embodiment, appliance 122 operates to receive an update file through a host 102 coupled to appliance 122. In various embodiments, the update file may be downloaded to host 102 from network 106. In some embodiments, the update file may be loaded onto host 102 from a compact disk or floppy disk. In one particular embodiment, appliance 122 couples to a host 102 through communications link 130a. In an alternative embodiment, appliance couples to network 106 indirectly through host 102 through communications link 130c. Host 102 may comprise, for example, a desktop computer, a laptop computer, a personal digital assistant, an external drive coupled to appliance 122, or any other computing or communicating device.

In the illustrated embodiment, system 100 includes a communications link 130 operable to facilitate the communication of information to and/or from appliance 122. Communications link 130 may include any hardware, software, firmware, or combination thereof. In various embodiments, communications link 130 may comprise any communications medium capable of assisting in the communication of analog and/or digital signals. Communications link 130 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication of information to and/or from appliance 122.

In the illustrated embodiment, appliance 122 includes an external interface 120 capable of facilitating the communication of information at least to and possibly from appliance 122. In one particular embodiment, interface 120 directly facilitates communication between appliance 122 and network 106 through a communications link 130b. In an alternative embodiment, interface 120 indirectly facilitates communication between appliance 122 and network 106 through communications link 130c.

In various embodiments, external interface 120 enables client 104 to communicate an update file to appliance 122 over network 106. In other embodiments, external interface 120 can enable host 102 to communicate an update file to appliance 122 over communications link 130a. Communicating the update file from client 104 to appliance 122 allows a user and/or appliance 122 to update the program stored on appliance 122 after delivery of appliance 122 to the user.

External interface 120 facilitates the communication of information to and/or from appliance 122. Interface 120 may include any hardware (e.g., modem, network, interface card, etc.), software (e.g., multi-layer protocol support, protocol conversion, data processing, data modulation, etc.), firmware, or combination thereof operable to facilitate communication with one or more elements external to appliance 122.

In this embodiment, appliance 122 includes a controller 128 capable of processing at least a portion of one or more programs 125 stored on appliance 122. For example, where appliance 122 comprises a digital audio player, controller 128 can operate to load a digital audio decoder file and to execute the file-decode sequence. Controller 128 may include any hardware, software, firmware, or combination thereof capable of processing at least a portion of the program stored on appliance 122. Although this example depicts controller 128 as a single processing device, controller 128 may comprise multiple processors, a processor array, or any other suitable processor or processors without departing from the scope of the present disclosure.

In this embodiment, appliance 122 includes a memory 124 operable to store one or more programs 125. Memory 124 may include any hardware, software, firmware, or combination thereof operable to store and facilitate retrieval of information. Memory 124 may store information using any of a variety of data structures, arrangements, and/or compilations. Memory 124 may, for example, include a dynamic random access memory (DRAM), a static random access memory (SRAM), a NAND flash memory, or any other suitable volatile or nonvolatile storage and retrieval device or combination of devices. Although this example depicts memory 124 as a single medium, memory 124 may comprise any additional number of storage media without departing from the scope of the present disclosure. All or part of memory 124 could reside locally within appliance 122 or could reside in a location remote from and accessible to appliance 122.

In one particular embodiment, memory 124 includes at least an open partition of memory 126a and at least a hidden partition of memory 126b. Although this example uses two partitions of memory 126a and 126b, any number of partitions can be used without departing from the scope of the present disclosure. In an alternative embodiment, open partition 126a and hidden partition 126b can comprise physically separate memory devices. As used throughout this document, the term "hidden partition" or "hidden portion" of memory refers to a part of memory 124 that is substantially free from access by a user through an external interface. A memory device 124 comprising at least hidden partition 126b is advantageous in substantially preventing a user from deleting or corrupting portions of the program stored on hidden partition 126b of memory 124, which can lead to an improved reliability of appliance 122. In addition, hidden partition 126b can enable program designers to substantially protect licensed code and/or software stored on memory device 124.

One aspect of this disclosure recognizes that hidden partition 126b enables upgrading of a program stored on appliance 122 in a relatively secure manner. That is, hidden partition 126b enables upgrading of the program by preventing access to the update file by a user and/or a device without the appropriate decryption sequence. In various embodiments, the update file comprises an encrypted format that substantially prevents installation/use of the update file without the appropriate decryption sequence.

Figure 2:
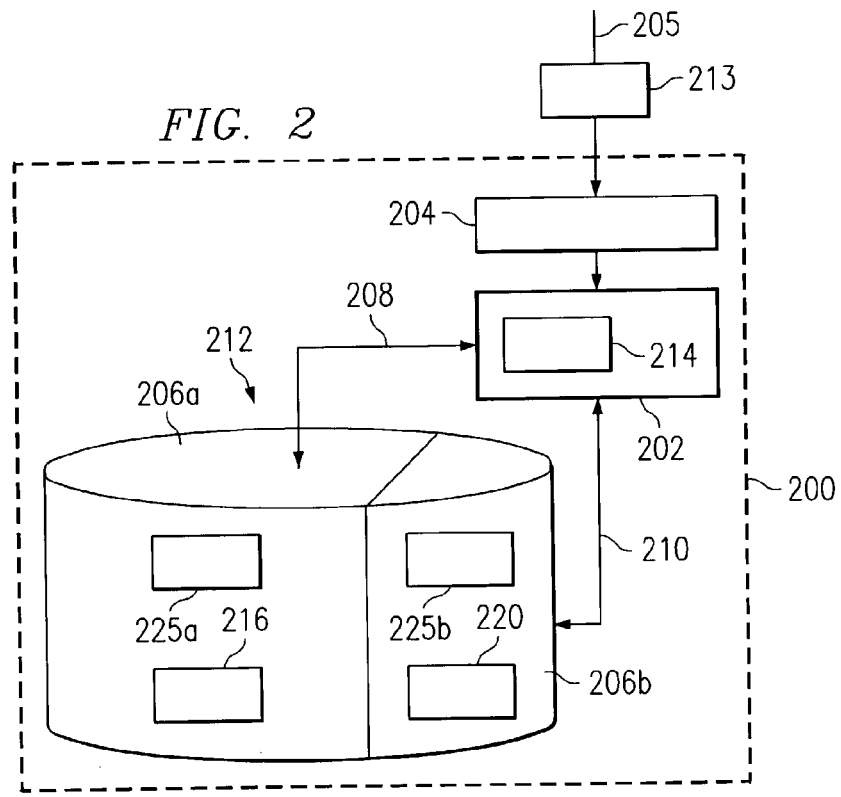
FIG. 2 is a block diagram illustrating one exemplary embodiment of an appliance implementing at least a hidden portion of memory.

FIG. 2 is a block diagram illustrating an exemplary embodiment of an appliance 200 implementing at least a hidden memory partition 206b. In various embodiments, the structure and function of appliance 200 can be substantially similar to appliance 122 of FIG. 1. In this example, appliance 200 includes an external interface 204 capable of communicating information to and possibly from appliance 200. In various embodiments, the structure and function of external interface 204 can be substantially similar to external interface 120 of FIG. 1. In this particular embodiment, external interface 204 operates to couple to a host through a communications link 205. In this particular example, communications link 205 comprises a universal serial bus (USB). Other types of communication links could be implemented without departing from the scope of the present disclosure.

In this embodiment, appliance 200 includes a memory 212 operable to store one or more programs 225 capable of contributing to one or more functions of appliance 200. Memory 212 may comprise any suitable storage and/or retrieval device or combination of devices. In this particular embodiment, memory 212 comprises NAND flash memory. In various embodiments, the structure and function of memory 212 can be substantially similar to memory 124 of FIG. 1. In this example, memory 212 comprises a single storage medium. Although this example illustrates memory 212 as a single storage medium, any additional number of storage media can be used without departing from scope of the present disclosure.

In this embodiment, memory 212 includes at least an open partition of memory 206a and at least a hidden partition of memory 206b. Open partition 206a operates to store those portions 225a of program 225 that are accessible to the user through external interface 204. In various embodiments, open partition 206a may store, for example, media files, data files, and/or any other information desired by program designers to be made accessible to the user. Similarly, hidden partition 206b operates to store at least a portion 225b of program 225 that a program designer desires to be made inaccessible to a user of appliance 200. Hidden partition 206b can store, for example, executable files, the operating portion of the program, operating system applications, Mass Storage Class drivers, decryption sequence libraries, firmware, software, data files, data libraries, rights management information, and/or any other desired information.

In the illustrated embodiment, hidden partition 206b comprises at least a portion of memory 212. In various embodiments, the structure and function of hidden partition 206b can be substantially similar to hidden partition of memory 126b of FIG. 1. In this particular embodiment, hidden partition 206b is substantially free from access by a user through external interface 204. Restricting access to portions 225b of program 225 is advantageous in substantially preventing a user from deleting and/or corrupting those portions of the program. The restricted access can lead to an improved reliability of appliance 200. In addition, hidden partition 206b can enable program designers to substantially protect licensed code, firmware, and/or software.

In this particular embodiment, hidden partition 206b comprises an atypical protocol and/or format that is generally incapable of being registered by a host through external interface 204. Implementing an atypical protocol and/or format allows hidden partition 206b to be substantially free from access by a user through external interface 204. In other embodiments, hidden partition 206b can comprise an encrypted file stored on memory 212. The encrypted file can be substantially free from access without the appropriate decryption sequence. In an alternative embodiment, hidden partition 206b can comprise a separate independent memory device that is not coupled to and/or capable of being isolated, at least temporarily, from external interface 204.

In this embodiment, appliance 200 includes a controller 202 capable of processing at least a portion of the program stored on memory 212. In various embodiments, the structure and function of controller 202 can be substantially similar to controller 128 of FIG. 1. In other embodiments, controller 202 can comprise a digital signal processor (DSP). As one particular nonlimiting example, controller 202 could comprise a C54x based digital signal processor. In this example, controller 202 couples to open partition 206a and hidden partition 206b through communication links 208 and 210, respectively. Communication links 208 and 210 may include any hardware, software, firmware, or combination thereof operable to facilitate communication between controller 202 and memory 212.

In some embodiments, appliance 200 operates to receive an update file through external interface 204. The update file received by appliance 200 may comprise, for example, software, firmware, code, data compilations, and/or combinations of these or any other type of information. In this particular embodiment, the update file received by appliance 200 comprises an encrypted update file 213, where the encryption is based at least in part on a unique product identification, such as an electronic serial number or the link, uniquely associated with appliance 200. Associating the encryption with a product identification uniquely identifying appliance 122 helps to ensure that the program update can only be applied to the intended appliance. In this example, controller 202 couples external interface 204 to open partition 206a and routes the encrypted update file for storage on open partition 206a.

In this embodiment, controller 202 comprises a secure program upgrade utility 214 operable to search open partition 206a for an encrypted update file and operable to upgrade at least a portion of the program stored on hidden partition 206b. In some embodiments, secure program upgrade utility 214 can cause controller 202 to periodically search for encrypted update files on open partition 206a. In other embodiments, secure program upgrade utility 214 can cause controller 202 to randomly search for encrypted update files on open partition 206a. In an alternative embodiment, an external command can instruct controller 202 to search for an encrypted update file on open partition 206a.

Upon identification of encrypted update file 213, secure program upgrade utility 214 of controller 202 operates to authenticate update file 213. In this particular embodiment, secure program upgrade utility 214 authenticates update file 213 based at least in part on a product identification uniquely associated with appliance 200. In this example, after controller 202 identifies a valid update file, controller 202 operates to isolate communications link 205 coupled to external interface 204 from appliance 200. The isolation of communication link 205 can be accomplished by various program commands and does not necessarily require a physical disconnection of the communication link. For example, controller 202 can instruct external interface 204 not to facilitate communication to and/or from communication link 205.

In this example, controller 202 loads a decryption sequence 220 from hidden partition 206b after isolation of the communication link. Decryption sequence 220 facilitates decryption of encrypted update file 213. Storing decryption sequence 220 in hidden partition 206b, while not required, provides an advantage of protecting the integrity of the decryption sequence. In various embodiments, controller 202 can load decryption sequence 220 before or simultaneously with the isolation of communication link 205. In this particular example, decryption sequence 220 loaded by controller 202 is based at least in part on a file extension associated with encrypted update file 213. In some embodiments, controller 202 can store decryption sequence 220 locally, eliminating a need to first load decryption sequence 220 from hidden partition 206b.

Following the isolation of communication link 205 and loading of decryption sequence 220, controller 202 operates to decrypt encrypted update file 213 and to store a decrypted update file 216 on open partition 206a. In an alternative embodiment, decrypted update file 216 can be stored on hidden partition 206b after decryption by controller 202. Storing decrypted update file 216 on hidden partition 206b before upgrading can result in a larger portion of memory 212 being reserved for hidden partition 206b. Storing decrypted update file 216 temporarily on either open partition 206a or hidden partition 206b advantageously allows verification of decrypted update file 216 before upgrading the portion of the program stored on hidden partition 206b.

In this example, controller 202 verifies decrypted update file 216 before upgrading the portion of the program stored on hidden partition 206b. In an alternative embodiment, decrypted update file 216 can directly upgrade that portion 225b of program 225 stored on hidden partition 206b without verification. In this example, after verification, controller 202 upgrades portion 225b of program 225 stored on hidden partition 206b by writing over the existing program. Once hidden partition 206b has been upgraded, controller 202 deletes decrypted update file 216 from open partition 206a. Controller 202 then re-establishes the connection with communication link 205 coupled to external interface 204.

Figure 3:
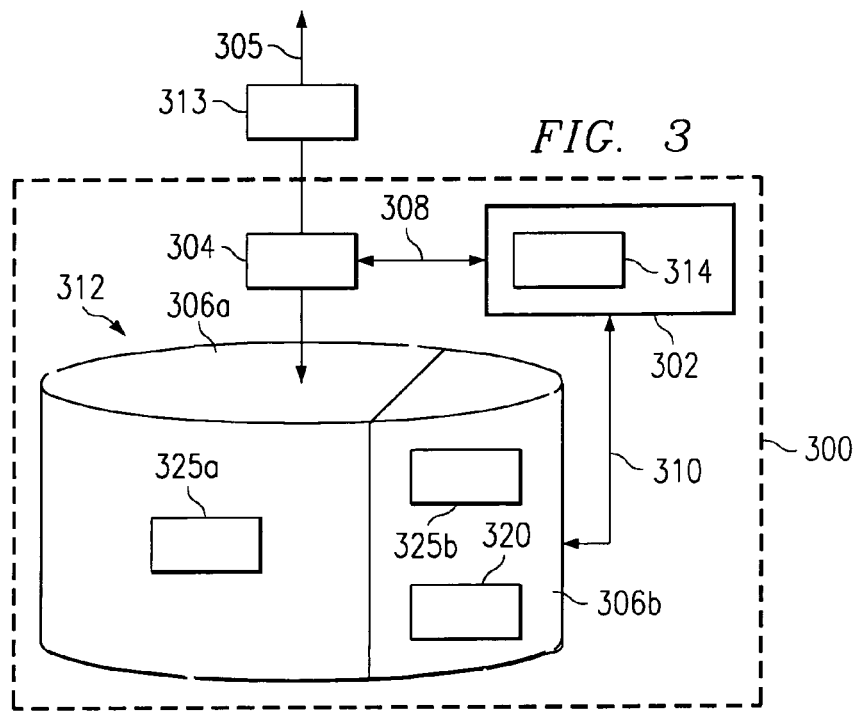
FIG. 3 is a block diagram illustrating another exemplary embodiment of an appliance implementing at least a hidden portion of memory.

FIG. 3 is a block diagram illustrating an exemplary embodiment of an appliance 300 implementing at least a hidden partition of memory 306b. In this example, the structure and function of appliance 300 can be substantially similar to appliance 122 of FIG. 1. In this example, appliance 300 includes an external interface 304 capable of communicating information to and possibly from appliance 300. In various embodiments, the structure and function of external interface 304 can be substantially similar to external interface 120 of FIG. 1. In this particular embodiment, external interface 304 operates to couple to a host through a communication link 305.

In this particular example, appliance 300 includes a memory 312 operable to store one or more programs 325 capable of at least partially contributing to one or more functions of appliance 300. In this particular embodiment, memory 312 comprises NAND flash memory. In various embodiments, the structure and function of memory 312 can be substantially similar to memory 212 of FIG. 2. In this embodiment, memory 312 comprises a single storage medium. Although this example illustrates memory 312 as a single storage medium, any additional number of storage media can be used without departing from scope of the present disclosure.

In this embodiment, memory 312 includes at least an open partition of memory 306a and at least a hidden partition of memory 306b. Although this example illustrates two partitions of memory 312, any additional number of partitions can be used without departing from the scope of the present disclosure. The structure and function of open partition 306a can be substantially similar to open partition 206a of FIG. 2. The structure and function of hidden partition 306b can be substantially similar to hidden partition 206b of FIG. 2.

In this embodiment, appliance 300 includes a controller 302 capable of processing at least a portion of program 325 stored on memory 312. In various embodiments, the structure and function of controller 302 can be substantially similar to controller 202 of FIG. 2. In this example, controller 302 couples to open partition 306a and hidden partition 306b through communication links 308 and 310, respectively. Communication links 308 and 310 may include any hardware, software, firmware, or combination thereof operable to facilitate communication between controller 302 and memory 312.

In this particular example, appliance 300 operates to receive an update file 313 through external interface 304. The structure and function of update file 313 can be substantially similar to update file 213 of FIG. 2. In this example, external interface 204 routes update file 313 for storage on open partition 306a.

In this embodiment, controller 302 comprises a secure program utility 314. In various embodiments, the structure and function of secure program utility 314 can be substantially similar to secure program utility 214 of FIG. 2. In this example, after secure program utility 314 identifies encrypted update file 313 and isolates communication link 305 from external interface 304, controller 302 loads a decryption sequence 320 from hidden partition 306b. In various embodiments, the structure and function of decryption sequence 320 can be substantially similar to decryption sequence 220 of FIG. 2.

Figure 4:
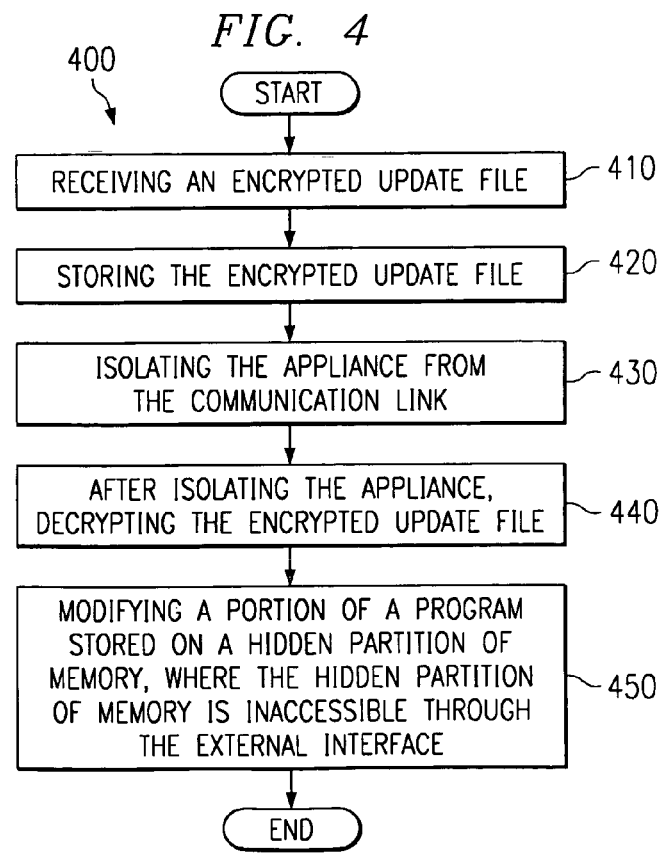
FIG. 4 is a flow chart illustrating an exemplary method for securely upgrading a program file stored on a hidden portion of memory.

FIG. 4 is a flow chart illustrating an exemplary method for securely upgrading at least a portion of a program stored on a hidden partition of memory in an appliance. In one particular embodiment, the portion of a program stored on the hidden partition depicted in FIG. 2 can be securely upgraded. In this example, method 400 begins at step 410 where appliance 200 receives an encrypted update file 213. In various embodiments, encrypted update file 213 can be received, for example, from a communications link 205 at an external interface 204.

In this example, encrypted update file 213 is stored in open partition 206a at step 420. In this example, controller 202 operates to route encrypted update file 213 from external interface 204 for storage on an open partition of memory 206a. In an alternative embodiment, external interface 204 can operate to route the encrypted update file to the open partition of memory. In this example, a secure program utility 214 operates to search open partition 206a for encrypted update file 213 and to authenticate update file 213. In various embodiments, secure program utility 214 searches open partition 206a periodically and/or randomly. In some embodiments, the authentication of update file 213 is based at least in part on a product identification uniquely associated with appliance 200.

In an alternative embodiment, encrypted update file 213 is stored in hidden partition 206b. In this example, controller 202 operates to route encrypted update file 213 from external interface 204 for storage on hidden partition of memory 206b. In some embodiments, a secure program utility 214 operates to search hidden partition 206b for encrypted update file 213 and to authenticate update file 213. In various embodiments, secure program utility 214 searches open partition 206b periodically and/or randomly. In some embodiments, the authentication of update file 213 is based at least in part on a product identification uniquely associated with appliance 200.

In this example, appliance 200 is isolated from communication link 205 at step 430. The isolation of communication link 205 can be accomplished by various program commands and does not necessarily require a physical disconnection of communication link 205. In this example, controller 202 loads a decryption sequence 220 from hidden partition 206b after isolation of communication link 205. In various embodiments, controller can load decryption sequence 220 before or simultaneously with isolating communication link 205. In other embodiments, controller 202 can store decryption sequence 220 locally.

Following the isolation of communication link 205, controller 202 operates to decrypt the encrypted update file at step 440. In various embodiments, decrypted update file 216 can be stored on open partition 206a. In other embodiments, decrypted update file 216 can be stored on hidden partition 206b. In some embodiments, decrypted update file can modify at least a part of portion 225b of program 225.

At least a part of portion 225b of program 225 stored on hidden partition 206b is modified at step 450 based at least in part on decrypted update file 216. In this example, hidden partition 206b is substantially inaccessible through external interface 204. In various embodiments, controller 202 can operate to verify decrypted update file 216 before modifying portion 225b of program 225 stored on hidden partition 206b. In other embodiments, controller 202 can operate to modify at least a part of portion 225b of program 225 directly without verification or storing decrypted update file 216.

In some embodiments, after modifying at least a part of portion 225b of program 225, controller 202 operates to delete decrypted update file 216 from open partition 206a. Following the deletion of decrypted update file 216, controller 202 operates to re-establish the connection with communication link 205.

In an alternative embodiment, appliance 200 is not isolated from communication link 205 at step 430. For example, controller 202 can receive and decrypt encrypted update file 213 without storing update file on a portion of memory 212. In that case, controller 202 operates to route the decrypted update file to hidden partition 206b to modify at least a part of portion 225b of program 225 stored on hidden partition 206b. In this example, controller 202 operates to modify at least a part of portion 225b of program 225 directly without verification or storing decrypted update file 216.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method of upgrading a program stored on an appliance, comprising:
receiving from a communication link an encrypted update file at an external interface of an appliance;
storing the encrypted update file on an open portion of a memory accessible through the external interface;
isolating the appliance from the communication link thereby preventing the appliance from communicating via the communications link;
while the appliance is isolated from the communications link, decrypting the encrypted update file;
while the appliance is isolated from the communications link, modifying at least a portion of a program stored on a hidden portion of memory based at least in part on the decrypted update file;
while the appliance is isolated from the communications link and after modifying the at least a portion of the program, deleting the decrypted update file from the open portion of memory; and after deleting the decrypted update file, re-establishing communication between the communication link and the appliance;

wherein the hidden portion of memory is inaccessible through the external interface.

2. The method of claim 1, wherein decrypting the update file is based at least in part on a product identification associated with the appliance.

3. The method of claim 1, further comprising: searching the open portion of the memory for the encrypted update file; authenticating the encrypted update file based at least in part on a product identification associated with the appliance; and loading a decryption sequence from the hidden portion of memory.

4. The method of claim 3, wherein searching the open portion of memory comprises a periodic search.

5. The method of claim 3, wherein searching the open portion of memory comprises a random search.

6. The method of claim 1, further comprising:

storing the decrypted update file on the open portion of memory; and verifying the decrypted update file.

* * * * *